United States Patent Office

Re. 27,388
Reissued June 13, 1972

27,388

ACCELERATED EPOXY-AMINE RESINOUS COMPOSITIONS CATALYZED WITH —SH YIELDING MATERIAL

Heinz Uelzmann, Cuyahoga Falls, Ohio, assignor to The General Tire & Rubber Company No Drawing. Original No. 3,554,967, dated Jan. 12, 1971, Ser. No. 792,853, Jan. 21, 1969. Application for reissue Mar. 22, 1971, Ser. No. 127,020
Int. Cl. C08g *30/14*
U.S. Cl. 260—47 EC 6 Claims

Matter enclosed in heavy brackets [ ] appears in the original patent but forms no part of this reissue specification; matter printed in italics indicates the additions made by reissue.

ABSTRACT OF THE DISCLOSURE

A sulfur compound, which can form a cure-accelerating, SH-containing compound in the presence of an amine curing agent, e.g., ethylene trithiocarbonate, is added to an epoxy resin composition. The resulting composition is stable, but will undergo rapid curing at low temperatures upon the addition of an amine curing agent.

BACKGROUND OF THE INVENTION

In the art of thermosetting resins, the epoxy resins have played a prominent role in recent years. An increasing variety of commercially valuable products and applications have come into being as more is learned about the properties of these resins and as further innovations are made in their technology. It is known that when epoxy resins are cured, they become infusible, insoluble, and they acquire certain chemical and physical properties that are in ways superior to those of other thermosetting resins. As a consequence, epoxy resinous compositions have been extensively used in making highly durable coatings, shaped laminates, reinforced plastic structures, and the like.

To bring about the transformation of an epoxy resinous composition from an uncured to a cured state, it is reacted with a cross-linking agent which, under the proper conditions and after the requisite amount of time, causes the resinous compositions to cure and harden. A well known group of cross-linking or curing agents are the amines. It has also been known that such curing agents alone, while they do bring about the desired curing of the epoxy resin, are burdened by the requirement of elevated temperature and/or prolonged periods of time to effect a complete cure.

Accordingly, a variety of curing accelerators have been used, the effect of which is to reduce either or both the time and temperature requirements. A recent, effective group of cure accelerators have been the SH-radical-containing compounds, specifically the mercaptans. These accelerators are mixed in with the epoxy resin and the amine curing agent, whereupon, a rapid cure, at relatively low temperatures, is obtained. This technique suffers, however, from some disadvantages, e.g., the adverse odor of the mercaptans, their instability to autoxydation, and short shelf life of the epoxy resins containing the mercaptan accelerators.

OBJECTS OF THE INVENTION

A primary object of this invention is to provide epoxy resinous compositions which are stable and which can be made to undergo rapid curing upon the addition thereto of an amine curing agent.

Another object is to provide a method of preparing epoxy resinous compositions which do not require an outside curing accelerator, but, rather, are self-cure-catalyzed upon the addition thereto of an amine curing agent.

A further object is the provision of epoxy resin compositions free of obnoxious odors.

Other objects and further scope of applicability of the present invention will become apparent from the detailed description given hereinafter; it should be understood, however, that the detailed description, while indicating preferred embodiments of the invention, is given by way of illustration only since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

To accomplish the foregoing objects, epoxy resin compositions are prepared comprising a relatively small amount of a sulfur-containing compound which, characteristically, reacts with a small portion of a subsequently added amine curing agent to form a cure-accelerating, SH-containing product. This product is formed in situ and fairly rapidly upon the addition of the amine curing agent. A ready-made curing accelerator is thus made, available, which otherwise would have to be added separately.

As will become evident from the descrijption hereinafter, a large number of sulfur-containing compounds are useful in practicing the invention. The primary requirement is that such compounds form relatively stable mixtures with epoxy resins. They, also, should be capable of undergoing cleavage in the presence of an amine curing agent or undergoing an addition reaction to form an SH-containing compound, which compound acts as a curing accelerator. This SH-containing compounds, reaction product, or curing accelerator should be at least partially accelerator. This SH-containing compound, reaction prod-soluble or dispersible, and preferably at least substantially soluble, in the epoxy material.

DESCRIPTION OF THE PREFERRED EMBODIMENTS

The following examples illustrate the invention. In all of the examples and throughout the remaining specification, all parts and percentages are by weight unless otherwise specified.

Example 1

This example and Example 2, illustrate the utility of ethylene trithiocarbonate in practicing the invention Three samples containing the indicated amounts of "Epon 828" were prepared, one being a control composition and two compositions according to the invention containing, in addition, the indicated amounts of ETTC, i.e., ethylene trithiocarbonate. In the latter two compositions, the ethylene trithiocarbonate was first liquified by heating and then mixed with the "Epon 828" at room temperature. Thereafter, the indicated amount of DETA, i.e., diethylene triamine, as curing agent was added to each of the three samples at room temperature (20–30° C.), and the gel time results were measured and recorded. The results are shown in Table 1 which reports the separate ingredients in parts and the gel time in minutes.

TABLE 1

| "Epon 828" | DETA | ETTC | Gel time |
|---|---|---|---|
| 20 | 1.6 | 0 | 70.0 |
| 19 | 1.6 | 1 | 5.5 |
| 18 | 1.6 | 2 | 2.8 |

Example 2

A mixture was prepared at room temperature which consisted of 18.5 grams "Epon 828," 1.5 grams ETTC, 2 drops water, 2 drops silicone (Dow Silicone 190) and 1.6 grams DETA. In 3.7 minutes the mixture cured to a foam.

Example 3

This example illustrates the utility of elemental sulfur in practicing the invention.

A mixture of 19 parts "Epon 828" and 1 part sulfur was prepared, to which 1.6 parts of DETA were then added at room temperature. The mixture gelled in 28–30 minutes.

Example 4

This illustrates the applicability of the invention to a variety of sulfur-containing compounds. In each case, 2 parts of the sulfur-containing compound were first mixed thoroughly with 18 parts of "Epon 828." Thereafter 1.6 parts of DETA were added at room temperature. The various sulfur-containing compounds are tabulated against the periods required for gelling in Table 2 below.

TABLE 2

| Compound used: | Gel time (minutes) |
|---|---|
| Benzyl N-phenylthiourethane | 6.0 |
| Phenyl N-phenyldithiourethane | 12–13 |
| S-benzyl isothiourea | 22–23 |
| S-phenyl thiobenzoate | 5.3 |
| 2-methoxyethyl S-benzyl xanthate | 8.7 |
| Benzyl disulfide | 45–50 |
| Dibenzoyl disulfide | 2.8 |
| Tetramethyl thiuramdisulfide | 31.0 |

Example 5

Half a cubic centimeter of carbon disulfide was slowly added under the surface to 10 grams of DETA with stirring. The DETA and $CS_2$ form a thiocarbamate salt or ion. When 1.6 grams of the resulting reaction product were mixed with 20 grams of "Epon 828" at room temperature, the mixture gelled in 35–40 minutes. When 3 grams of the reaction product were mixed in with 20 grams of "Epon 828" at room temperature, the mixture gelled in 13.2 minutes.

Example 6

The same procedure of Example 5 was followed, using 10 grams of DETA and one cubic centimeter of carbon disulfide. When 3 grams of the resulting reaction product were mixed in with 20 grams of "Epon 828" at room temperature the mixture gelled in 8 minutes.

DISCUSSION OF DETAILS

The present invention provides an improvement over the prior uses of amines to cure epoxy resins and over the recently discovered utility of mercaptans to accelerate such curing. As to the former, it eliminates the requirements of elevated temperature and/or prolonged periods of curing time; as to the latter, it does away with the added step of mixing in the mercaptan accelerator along with the amine to bring about a rapid cure.

The invention is based on the discovery that sulfur compounds which form mercaptans in the presense of an amine curing agent are in themselves useful as curing accelerators. The following equations are illustrative:

1. Trithiocarbonates (a) $RS-\overset{\overset{\large S}{\|}}{C}-SR + R_1NH_2 \longrightarrow RSH + R_1NH-CSSR$ (b) $RS-\overset{\overset{\large S}{\|}}{C}-SR + R_1NHR_1 \longrightarrow RSH + (R_1)_2NCSSR$ (c) 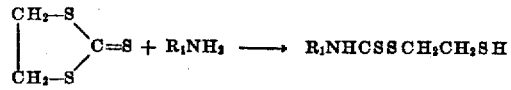

2. Thiocarboxylic Esters (a) $R\overset{\overset{\large S}{\|}}{C}-SR_1 + R_2NH_2 \longrightarrow R\overset{\overset{\large S}{\|}}{C}NHR_2 + R_1SH$ (b) $R\overset{\overset{\large O}{\|}}{C}-SR_1 + R_2NH_2 \longrightarrow R\overset{\overset{\large O}{\|}}{C}-NHR_2 + R_1SH$ 3. Thiosulfonic Acid Esters $RSO_2SR_1 + R_2NH_2 \longrightarrow RSO_2NHR_2 + R_1SH$ 4. Xanthates and Thiosulfate Esters (Bunte Salts)

(a) $RO-\overset{\overset{\large S}{\|}}{C}-SR_1 + R_2NH_2 \longrightarrow RO-\overset{\overset{\large S}{\|}}{C}-NHR_2 + R_1SH$ (b) $RSSO_2OM + R_1NH_2 \longrightarrow R_1NHSO_3M + RSH$ where M is a monovalent metal, preferably an alkali metal (Li, Na, K, Rb, and Cs)

5. Isothioureas and Isothiuronium Compounds $$\begin{matrix} RNH \\ | \\ C \\ \| \\ NH \end{matrix}-S-R_1 + R_2NH_2 \longrightarrow \begin{matrix} RNH \\ | \\ C \\ \| \\ NH \end{matrix}-NH_2 + R_1SH$$

6. Thiurammono-, di-, and polysulfides

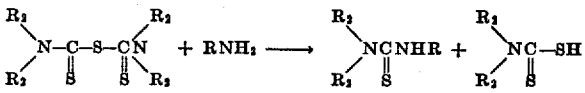

7. Thiourethanes (Mono and Di)

(a) $RNH\overset{\overset{\large O}{\|}}{C}-SR_1 + R_2NH_2 \longrightarrow RNH\overset{\overset{\large O}{\|}}{C}NHR_2 + R_1SH$ (b) 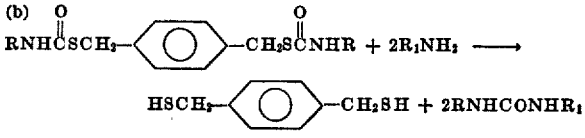

8. Carbon Disulfide, Sulfur, and Carbonyl Sulfide $CS_2 + 2RNH_2 \longrightarrow RNH\overset{\overset{\large S}{\|}}{C}-SH \longrightarrow RNH\overset{\overset{\large S}{\|}}{C}-\overset{\ominus}{S}\ \overset{\oplus}{R}NH_3$ 9. Acyl Sulfides, -disulfides, and - polysulfides $$R-\overset{\overset{\large O}{\|}}{C}-S-\overset{\overset{\large O}{\|}}{C}-R_1 + R_2NH_2 \longrightarrow R\overset{\overset{\large O}{\|}}{C}-\overset{\overset{\large H}{|}}{N}R_2 + R_1\overset{\overset{\large O}{\|}}{C}-SH$$

The sulfur and sulfur containing materials used to react with the amines to form the accelerator material are known compounds which can be prepared by processes known to the chemist. Specific examples of some of these compounds are ethylene trithiocarbonate, S-phenylthiobenzoate ethyl dithiobenzoate, diethyl xanthate, 2-methoxyethyl-S-benzyl xanthate, sodium-S-phenyl thiosulfiate (S-benzylisothiourea, benzyl isothiouronium chloride, tetramethylthiuram, monosulfide, tetramethyl thiuram tetrasulfide, tetraethyl thiuram disulfide, benzyl N-phenyl thiourethane, N,N'-dimethyl-para phenylene dimethylthiourethane, dibenzoyl sulfide, dibenzoyl disulfide and the like. Mixtures of sulfur and the sulfur containing compounds can be used. The R's (R, $R_1$, $R_2$, etc.) in the above formulae can be aliphatic, aromatic, or heterocyclic radicals, saturated (preferred) or ethylenically unsaturated. These radicals can contain alkoxy or phenoxy groups, halogen atoms (F, Br, Cl) and so forth. Preferably, the R's are alkyl, aryl, cycloalkyl, alkaryl, aralkyl, alkylcycloalkyl, arylcycloalkyl, alkoxy, alkoxyaryl, alkoxyalkyl and the like radicals containing from 1 to 18 carbon atoms and where 1 to 3 of the hydrogen atoms can be repaced with halogen atoms.

The success of the invention is, at least in part, due to the discovery that most of the sulfur compounds contemplated for use in the invention are more stable towards autoxydation than mercaptans. They can, therefore, be mixed in with the epoxy resin, much in advance of the time when the amine curing agent is to be added to effect the curing of the epoxy resin, and the mixture will be storage-stable. Additionally, most of these compounds are also odorless.

Some di- and polysulfides will also give SH-containing cleavage products. Depending on the starting materials, di- and polymercaptans can be generated; and, while diethylene triamine and triethylene tetramine are the preferred curing agents for use with epoxy resins in accordance with the invention, any other mono-, di-, and polyamines known to be useful for the curing of epoxy resins may be used (see "Epoxy Resins" by Lee and Neville, McGraw-Hill Book Company, Inc., New York, 1957). Mixtures of amines can be used. A small part of these amines will generate the mercaptan, while the remainder acts to cure the resin.

Examples of additional amines that are effective in carrying out the invention include diethylamine, dibutylamine, methyl aniline, hexyl aniline, benzyl methyl amine, methyl propanolamine, ethyl ethanolamine, isopropanol methylamine, diethanolamine, hexylethanolamine, 3-ethylaminophenol, octyl methylamine, cyclohexylamine, octylamine, ethanolamine, naphthylamine, hexamethylene diamine, and similar homologous and isomeric amines. The amines and methods for making them are well known to those skilled in the art.

In view of the differences in reactivity, with the amines, of the SH-generating compounds, varying rates of release of the mercaptan are possible. Thus, by a manipulation of the type and amount of the sulfur-containing compound used and the curing temperature, it is possible to manipulate and control the rate of cure of the epoxy resin according to each application or specific requirement.

Any type of resinous composition containing an active epoxy component capable of being cured to a solid state is contemplated within the scope of the invention. Linear polymeric glycidyl polyethers having, on the average, more than 1 1,2-epoxy groups per molecule are preferred. A variety of such epoxy products are commercially available, e.g., "Epon 828," which is a mixture of glycidyl polyethers made by reacting epichlorohydrin with bisphenol A. Many additional polyepoxy compounds capable of forming gels and being cured to solid products can be prepared by reaction of epichlorohydrin with bisphenols, e.g., see U.S. 2,506,486, the disclosure of which regarding polyepoxy compounds is incorporated herein by reference. Further examples of epoxy compounds which may be used in forming epoxy resinous compositions are disclosed in U.S. 2,871,217. These, and related equivalent epoxy materials known to be useful in this art, may be employed in carrying out the new methods and forming the new products of this invention.

The proportions of ingredients used in forming epoxy resinous compositions in accordance with the invention may be varied and will depend in part upon the sulfur compound and amine used. Advantageously, one uses from about 0.5 to 15 parts by weight of the amine curing agent and from about 0.5 to 20 parts by weight of sulfur or the sulfur-containing additive for each 100 parts by weight of the active epoxy resin forming material, e.g., glycidyl polyether. Within the given range large amounts of the sulfur or sulfur-containing accelerator are used in making thin sections, films or laminates. Small amounts of the sulfur or sulfur-containing accelerator are used in making thin sections, films or laminates. Small amounts of the sulfur or sulfur-containing accelerator are used where thick sections are to be cast, molded and so forth such as in encapsulation due to the large amount of heat generated from the exothermic reaction or where the composition or laminate is to be heated.

Any of the mixing techniques which are useful in the epoxy resin art may be employed to prepare the compositions contemplated by the invention. And various additives may be incorporated in these compositions such as fibrous reinforcements (nylon, glass, rayon, polyester, etc. fibers), fillers, dyes, pigments, plasticizers, modifiers, inhibitors, and the like.

The field of applicability of compositions prepared according to the teachings of the invention encompass both rigid and semi-rigid epoxy resinous products. Among a few of the areas in which the invention is particularly useful is in making reinforced plastic shapes, panels, food trays, automobile fender extenders, hoods, auto body parts, and boat hulls; laminates; coatings; furniture parts; utensils; floor and wall coverings; and the like. Another area of use is the formation of epoxy resin adhesives that may be used, because of the accelerated cure properties, for general utility repair of broken items, for joining metal to plastic, cementing plastic foams to wood, metal or rubber and similar adhesive applications.

The embodiments of the invention in which an exclusive property or privilege is claimed as defined as follows:

1. A catalyzed epoxy resinous composition capable of rapid curing which comprises:
   (a) 1,2-epoxy base resin which is a linear polymeric glycidyl polyether having, on the average, more than one 1,2-epoxy groups per molecule;
   (b) a curing agent selected from the group consisting of primary and secondary amine, and
   (c) sulfur containing material which forms —SH containing cleavage product in the presence of said curing agent selected from the group consisting of sulfur, carbon disulfide, *carbonyl sulfide*, trithiocarbonates, monothiocarboxylic esters, dithiocarboxylic esters, thiosulfonic acid esters, thiosulfate esters, xanthates, *isothioureas*, isothiuronium compounds, monothiourethanes, dithiourethanes, acyl monosulfides and acyl disulfides.

2. In a method of preparing an epoxy resinous composition by curing of a curable 1,2-epoxy base resin composition wherein said resin is a linear polymeric glycidyl polyether having more than one 1,2-epoxy groups per molecule in the presence of a primary or secondary amine curing agent, the step of adding to said resin composition sulfur containing material which forms —SH containing cleavage product in the presence of said curing agent selected from the group consisting of sulfur, carbon disulfide, *carbonyl sulfide*, trithiocarbonates monothiocarboxylic ester, dithiocarboxylic esters, thiosulfonic acid esters, thiosulfate esters, xanthates, *isothioureas*, isothiuronium compounds, monothiourethanes, dithiourethanes, acyl monosulfides and acyl disulfides.

3. A catalyzed epoxy resinous composition as claimed in claim [2] *1* which contains from about 0.5 to 15 parts by weight of said curing agent and from about 0.5 to 20 parts by weight of said sulfur containing material per 100 parts by weight of said glycidyl polyether.

4. A catalyzed epoxy resinous composition capable of rapid curing which comprises:

(a) 1,2-epoxy base resin which is a linear polymeric glycidyl polyether having, on the average, more than one 1,2-epoxy groups per molecule;

(b) a curing agent selected from the group consisting of primary and secondary acyclic polyamines containing 4 to 16 carbon atoms; and (c) sulfur, said composition containing 0.5 to 15 parts by weight of said curing agent and from about 0.5 to 20 parts sulfur by weight per 100 parts by weight of said base resin.

5. A catalyzed epoxy resinous composition capable of rapid curing which comprises:

(a) linear polymeric glycidyl polyether bas resin having more than one 1,2-epoxy groups per molecule;

(b) a curing agent selected from the group consisting of primary and secondary acyclic polyamines containing 4 to 16 carbon atoms; and (c) ethylene trithiocarbonate, said composition containing said components in the weight ratio a:b:c between 100:0.5:0.5 and 100:15:20.

6. A catalyzed epoxy resinous composition as claimed in claim 5 wherein said curing agent is diethylene triamine.

References Cited

The following references, cited by the Examiner, are of record in the patented file of this patent or the original patent.

UNITED STATES PATENTS

| | | |
|---|---|---|
| 2,849,417 | 8/1958 | Tsang. |
| 3,026,305 | 3/1962 | Robinson, Jr. |

WILLIAM H. SHORT, Primary Examiner

T. E. PERTILLA, Assistant Examiner

U.S. Cl. X.R.

117—161; 161—184; 260—2 EC, 47 EN, 79, 830

PO-1050
(5/69)

UNITED STATES PATENT OFFICE
CERTIFICATE OF CORRECTION

Patent No. Re. 27,388 Dated June 13, 1972

Inventor(s) Heinz Uelzmann

It is certified that error appears in the above-identified patent and that said Letters Patent are hereby corrected as shown below:

Column 2, line 37, which reads "made, available," should read ---made available,---.

Column 2, line 39, which reads "descrijption" should read ---description---.

Column 2, line 47, which reads "compounds" should read ---compound---.

Column 2, delete line 49, which reads "accelerator. This SH-containing compound, reaction prod-".

Column 4, equation No. 5, that portion of the formula reading $$\begin{array}{c} RNH \\ | \\ C - NH_2 \\ \| \\ NH \end{array} + R_1SH \quad \text{should read} \quad \begin{array}{c} RNH \\ | \\ C - NHR_2 \\ \| \\ NH \end{array} + R_1SH$$

Column 5, line 1, which reads "(S-benzylisothiourea," should read ---,S-benzylisothiourea,---.

Column 5, line 16, which reads "repaced" should read ---replaced---.

Column 6, lines 11-13, delete that portion which reads "Small amounts of the sulfur or sulfur-containing accelerator are used in making thin sections, films or laminates.".

Column 7, line 15, Claim 5, which reads "bas" should read ---base---.

Signed and sealed this 20th day of March 1973.

(SEAL)
Attest:

EDWARD M.FLETCHER,JR.
Attesting Officer

ROBERT GOTTSCHALK
Commissioner of Patents